Figure 1:
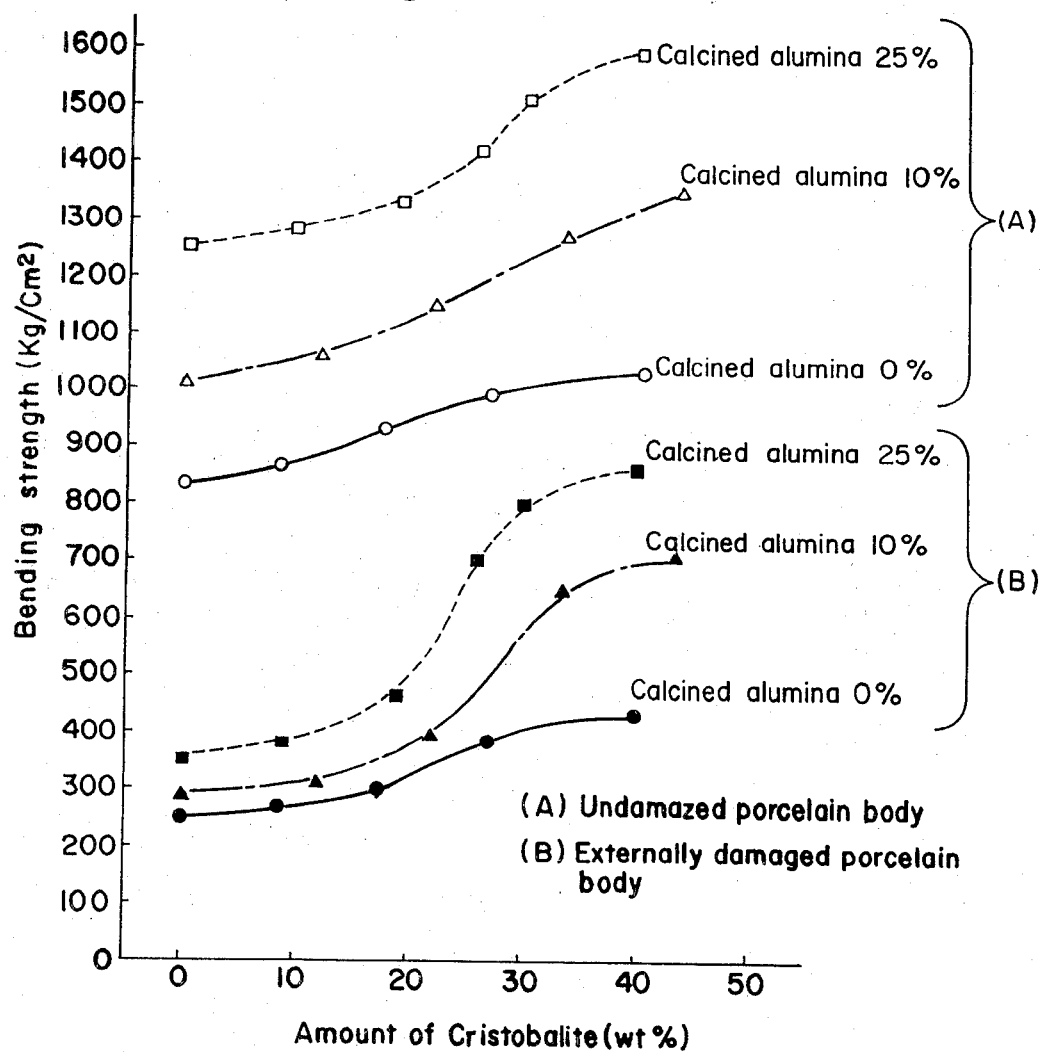

United States Patent [19]

Higuchi et al.

[11] 3,860,432

[45] Jan. 14, 1975

[54] PORCELAIN ELECTRIC INSULATOR

[75] Inventors: Noboru Higuchi; Yutaka Ogawa; Soji Takeuchi, all of Nagoya City, Japan

[73] Assignee: NGK Insulators, Ltd., Nagoya, Japan

[22] Filed: Nov. 2, 1972

[21] Appl. No.: 303,279

Related U.S. Application Data

[63] Continuation-in-part of Ser. No. 55,111, July 15, 1970, abandoned.

[52] U.S. Cl.................. 106/46, 106/65, 106/67
[51] Int. Cl.. C04b 33/26, C04b 33/24, C04b 35/00
[58] Field of Search............ 106/46, 65, 67; 264/61

[56] References Cited
UNITED STATES PATENTS

| 2,152,655 | 4/1939 | McDougal | 106/46 |
|---|---|---|---|
| 2,152,656 | 4/1939 | McDougal | 106/46 |
| 2,887,394 | 5/1959 | Bickford | 106/46 |
| 2,898,217 | 8/1959 | Selsing | 106/46 |
| 2,979,413 | 4/1961 | Ballman et al. | 106/65 |
| 3,097,101 | 7/1963 | Lester | 106/46 |
| 3,431,126 | 3/1969 | Fukin | 106/46 |
| 3,459,567 | 8/1969 | Yamamoto et al. | 106/46 |

OTHER PUBLICATIONS

Kingery, W. D.; Introduction to Ceramics; New York, 1960, pp. 418–427 (TP807K5i).
Tyrell, M. E. et al., Synthetic Coroberite (II), in US Bur. Mines Bulletin No. 594 (1961) pp. 8–14 (TN 2304).

*Primary Examiner*—Winston A. Douglas
*Assistant Examiner*—Mark Bell
*Attorney, Agent, or Firm*—Robert E. Burns; Emmanuel J. Lobato; Bruce L. Adams

[57] ABSTRACT

A porcelain electric insulator having excellent mechanical strength and excellent bending strength even after being externally damaged, whose porcelain body consists of 10 to 35% by weight of corundum, 25 to 40% by weight of cristobalite, 15 to 30% by weight of mullite, 2 to 8% by weight of quartz, and the remainder of glassy phase.

18 Claims, 2 Drawing Figures

PORCELAIN ELECTRIC INSULATOR

This application is a continuation-in-part of our co-pending application Ser. No. 55,111, filed July 15, 1970 and now abandoned.

This invention relates to a porcelain electric insulator, and more particularly to a cristobalite-alumina porcelain body suitable for electric insulator having excellent mechanical strength and excellent bending strength even after being externally damaged and which is suitable for use in the high and extra high voltage power transmission line.

Porcelain electric insulators have heretofore adopted three kinds of porcelains, that is, (1) feldspathic porcelain, (2) alumina containing porcelain and (3) cristobalite porcelain.

1. The feldspathic porcelain is obtained by firing a mixture which consists essentially of 15 to 30 wt% of quartz material, 20 to 40 wt% of feldspathic material and 40 to 60 wt% of clay material. The porcelain body thus fired consists of 10 to 20 wt% of quartz and 10 to 20 wt% of mullite and the remainder of glassy phase. Such feldspathic porcelain is comparatively cheap in raw material cost and has an excellent workability so that heretofore been used for the porcelain electric insulators, but has disadvantage that its mechanical strength is not sufficient to use it for porcelain electric insulators which require an excellent mechanical strength.

2. The alumina containing porcelain has been developed for the purpose of improving the mechanical strength of the feldspathic porcelain. The alumina containing porcelain is obtained by firing a mixture in which a part or all of the quartz material and a part of the feldspathic material and a part of the clay material is substituted by 20 to 40 wt% of alumina. The porcelain body thus fired contains 20 to 40 wt% of corundum. The more the porcelain contains corundum, the more its mechanical strength becomes increased.

Experimental tests have shown that the bending strength of a glazed test piece made of the alumina containing porcelain is on the order of 1,200 to 1,700 kg/cm$^2$. Thus, the alumina containing porcelain has recently become noteworthy as porcelain electric insulators having an excellent mechanical strength. But, the alumina containing porcelain has the disadvantage that in case of designing the porcelain electric insulator, it is necessary to make the guaranteed values of mechanical strength thereof low by taking a large safety factor into account irrespective of the excellent mechanical strength of the test piece owing to the following reasons. That is, (a) the distribution of flaw becomes large dependence with the increase of the diameter of the porcelain body with the result that the homogeneity of material becomes lost, in other words the mechanical strength becomes decreased owing to the size effect, and (b) the mechanical strength becomes decreased when scratches are formed on the surface of the porcelain electric insulators by careless handling during transportation and construction or shot-marks are produced on the surface of the porcelain electric insulators by mischievous conducts such as gun shot, etc.

3. The cristobalite porcelain is obtained by firing a mixture whose chemical composition is substantially the same as that of the feldspathic porcelain. The porcelain body thus fired contains not only mullite and quartz but also cristobalite crystals having high thermal expansion property. The presence of these cristobalite crystals makes the mechanical strength of the undamaged cristobalite porcelain higher than that of the feldspathic porcelain. This mechanical strength of the undamaged cristobalite porcelain is lower than that of the alumina containing porcelain, but the rate of decrease of the mechanical strength of the undamaged cristobalite porcelain due to the size effect is smaller than that of the alumina containing porcelain. Moreover, the bending strength of the externally damaged cristobalite porcelain is not sufficient enough to withstand a specially high bending strength necessary for the porcelain electric insulators.

The inventors have proposed a porcelain article whose porcelain consists essentially of 100 wt. parts of common porcelain added with 3 to 15 wt. parts of mullite, 3 to 10 wt. parts of cristobalite and 3 to 10 wt. parts of alumina as described in the U.S. Pat. No. 3,459,567.

In such porcelain article, the addition of mullite permits of improving the mechanical strength of the porcelain, the addition of alumina makes it possible to prevent the firing deformation caused by the addition of mullite, and the addition of cristobalite ensures a compensation of the decrease of thermal expansion caused by the addition of mullite and alumina.

The above mentioned porcelain body has a further disadvantage in that even though the mechanical strength of this porcelain is high when the article is new and in sound condition, the mechanical strength considerably decrease when the porcelain surface is externally damaged. Moreover, mechanical strength of this porcelain in sound condition is not so high as that of the porcelain according to the present invention, because the corundum content of the former is lower than that of the latter.

It is a principal object of the invention to provide an improved high mechanical strength porcelain electric insulator even after being externally damaged.

The invention is based on a discovery that a porcelain electric insulator having an excellent bending strength even after being externally damaged may be produced by preparing a mixture consisting of 65 to 90 wt% of a batch (A) and 10 to 35 wt% of a batch (B), dehydrating and shaping the mixture to form a body, drying the body and firing the dried body at a temperature of 1,200 to 1,350°C, wherein the batch (A) consists essentially of feldspathic material, quartz material and clay material, minerally consists of 10 to 20 wt% of feldspar substance, 30 to 60 wt% of quartz substance and 20 to 50 wt% of clay substance, chemically consists of 65 to 83 wt% of $SiO_2$, 15 to 28 wt% of $Al_2O_3$, 2.0 to 4.5 wt% ($K_2O+Na_2O$) and inevitable impurities and a ratio of $K_2O/(K_2O+Na_2O)$ being 1/10 to 1/2, the above mentioned quartz material having a grain size distribution consisting of not more than 20 wt% of particles with an effective diameter larger than 10 microns, and the above mentioned batch (B) is alumina material. The porcelain body thus obtained consists 10 to 35 wt% of corundum, 25 to 40 wt% of cristobalite, 15 to 30 wt% of mullite, 2 to 8 wt% of quartz and the remainder of a glassy phase. The porcelain body has a bending strength of about 1,700 to 2,300 kg/cm$^2$, when the bending strength is measured by taking the glazed test specimens of 12 mm dia. and 100 mm span and by increasing the bending load at a rate of 200 kg/min.

Figure 2:
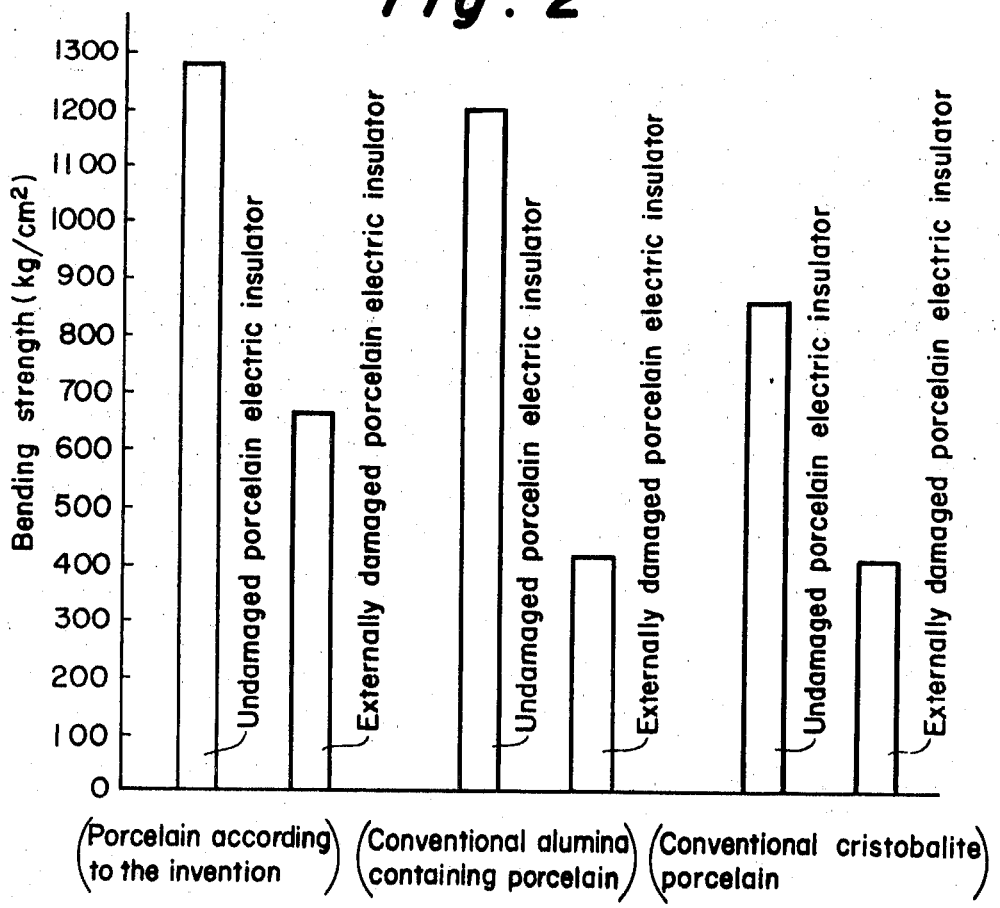

The invention will be more fully understood with reference to the following detailed specification and claims taken in connection with the accompanying drawings, in which:

FIG. 1 is curves illustrating the effect of the amount of cristobalite in the test porcelain bodies for changing the bending strength thereof; and FIG. 2 is a series of graphs illustrating the comparison of the bending strength of a porcelain solid core electric insulator according to the invention to those of conventional solid core porcelain electric insulators.

The invention will now be described with reference to a preferred mode of carrying out the invention.

In the first place following batches (A) and (B) are prepared.

The batch (A) consists essentially of feldspathic material containing more than 40 wt% of feldspar and quartz or eventually a minute amount of sericite, quartz material containing more than 50 wt% of quartz, kaolinite and sericite or eventually a minute amount of feldspar and clay material containing more than 80 wt% of kaolinite and a minute amount of quartz or eventually a minute amount of feldspar, minerally consists of 10 to 20 wt% of feldspar substance, 30 to 60 wt% of quartz substance and 20 to 50 wt% of clay substance, chemically consists of 65 to 83 wt% of $SiO_2$, 15 to 28 wt% of $Al_2O_3$, 2.0 to 4.5 wt% of $(K_2O+Na_2O)$ and inevitable impurities and a ratio of $K_2O/(K_2O+Na_2O)$ being 1/10 to 1/2, the above mentioned quartz material having a grain size distribution consisting of not more than 20 wt% of particles with an effective diameter larger than 10 microns. The batch (A) is pulverized by means of a pulverizer such as a trommel, etc.

The batch (B) is alumina material, that is, pulverized calcined alumina produced by Bayer process or pulverized calcined bauxite, in general, the bauxite is obtained by crushing raw bauxite having an ignition loss of 11.0 to 33.0 wt% and consisting of 0.5 to 8.0 wt% of $SiO_2$, 53.0 to 80.0 wt% of $Al_2O_3$, 0.7 to 4.0 wt% of $Fe_2O_3$, 0.5 to 10.0 wt% of $TiO_2$, not more than 1.0 wt% of $CaO$, not more than 0.5 wt% of $MgO$, not more than 1.0 wt% of $K_2O$ and not more than 1.0 wt% of $Na_2O$, then pulverizing the crushed products to particles with a diameter on the order of less than 30 mm, calcining the particles in a furnace such as a rotary kiln at a temperature of 1,350° to 1,600°C to remove adherent water, water of crystallization and organic substances, thereby obtaining calcined bauxite clinker. The calcined bauxite clinker thus obtained is crushed again by a crusher such as an edge-runner mill and finally pulverized by a pulverizer such as a trommel, etc.

65 to 90 wt% of the batch (A) and 10 to 35 wt% of the batch (B) are mixed in a mixer such as a trommel, etc. to prepare a mixture. The mixture thus prepared is dehydrated and shaped to form a body. The body is then dried and the dried body is fired at a temperature of 1,200° to 1,350°C to produce the porcelain bodies consisting of 10 to 35 wt% of corundum, 25 to 40 wt% of cristobalite, 15 to 30 wt% of mullite, 2 to 8 wt% of quartz and the remainder of glassy phase.

The invention is also based on the discovery that when the fired porcelain body contains 25 to 40 wt% of cristobalite, the mechanical strength of the externally damaged porcelain becomes considerably increased owing to the following reason.

FIG. 1 shows characteristic curves of the test porcelain bodies fixed at 1,280°C from the mixtures consisting of 100 wt% of a batch and a 0 wt% of calcined alumina, of 90 wt% of the batch and 10 wt% of calcined alumina, and of 75 wt% of the batch and 25 wt% of calcined alumina, respectively, the batch being prepared from a combination of several kinds of quartz material pulverized into various grain size distributions, several kinds of feldspathic material and clay material. In FIG. 1 the abscissa shows the amount of fired cristobalite while the ordinate shows the bending strength.

The bending strength of undamaged bar-shaped solid test porcelain bodies each having a diameter of 80 mm and a span of 800 mm was measured with the aid of a center point loading method. The bending strength of externally damaged test porcelain bodies was measured after that portion of each test porcelain body on which the maximum tensile stress was applied in the center point loading method has been cut into a depth of about 2 mm by means of a chisel having a tip of 0.5 R.

The amount of cristobalite was measured with the method of quantitative analysis by X-ray diffraction.

The amount of corundum in the fired porcelain body was found to be nearly equal to the amount of the mixed calcined alumina in the batch by X-ray diffraction.

As seen from FIG. 1, the bending strength of the externally damaged test porcelain bodies is about 50% that of the undamaged test porcelain bodies when the amount of cristobalite is more than 25 wt%, but is reduced to less than 40% that of the undamaged test porcelain bodies when the amount of cristobalite is not more than 25 wt%. Thus, it is apparent that the resisting property of porcelain electric insulator against the external damage becomes larger when its porcelain body contains more than 25 wt% of cristobalite. FIG. 1 shows that the bending strength increases in accordance with the increase of the amount of the alumina (corundum) and that the bending strength of the externally damaged insulator whose alumina (corundum) content is 0 wt% is substantially the same as those of the porcelain body containing 10 wt% and 25 wt% of the alumina (corundum) when the amount of cristobalite is less than 25 wt%, with the result that the bending strength of the externally damaged insulator has a low absolute value.

Thus, it is evident that the amount of the corundum in the fired porcelain body should be more than 10 wt% and the amount of the fired cristobalite in the fired porcelain body should be not less than 25 wt%.

As above mentioned it is desirable that the porcelain body contains a sufficient amount of cristobalite. But, the maximum amount of cristobalite in the porcelain body fired at 1,200° to 1,350°C from the mixture consisting of the batches (A) and (B) should be 40 wt%. When the porcelain body contains more than 40 wt% of cristobalite, feldspar substance will be decreased and quartz substance will be increased, with the result that the vitrifying temperature becomes considerably raised.

The reason why the batch (A) consists essentially of feldspathic material, quartz material and clay material is as follows. In the first place, the quartz material is dissolved into feldspathic glass to crystallize cristobalite. Inevitable impurities in the quartz material do not have such function. Secondly, the feldspathic material is required to produce feldspathic glass while inevitable impurities in the feldspathic material are not required to produce such feldspathic glass. Finally, the clay material having a plastic property serves to afford a favourable workability to the porcelain body while inevitable impurities in the clay material do not have such function.

The reason why the mineral compositions of the batch (A) are limited to 10 to 20 wt% of feldspar substance, 30 to 60 wt% of quartz substance and 20 to 50 wt% of clay substance is as follows. The above limitation makes it possible to practically realize the method for producing a porcelain electric insulator according to the invention, to produce porcelain electric insulators having stable characteristics and also effectively control the qualities of the porcelain electric insulators, with the result that the fired porcelain body contains 25 to 40 wt% of cristobalite.

Further, the reason why the batch (A) chemically consists of 65 to 83 wt% of $SiO_2$, 15 to 28 wt% of $Al_2O_3$, 2.0 to 4.5 wt% of ($K_2O+Na_2O$) and inevitable impurities and a ratio of $K_2O/(K_2O+Na_2O)$ being 1/10 to 1/2, said quartz material having a grain size distribution consisting of not more than 20 wt% of particles with an effective diameter larger than 10 microns is as follows. The amount of cristobalite to be produced after firing is dependent upon the amount of $SiO_2$, the amount of ($K_2O+Na_2O$) and the ratio of $K_2O/(K_2O+Na_2O)$ involved in the glass phase produced when the porcelain body is fired at the highest temperature. Lesser amount of $SiO_2$, larger amount of $K_2O+Na_2O$ and greater ratio of $K_2O/(K_2O+Na_2O)$ serve to crystallize smaller amount of cristobalite. Moreover, in the present invention a mixture containing 10 to 35 wt% of alumina material is fired in order to obtain a porcelain body containing more than 25 wt% of cristobalite. Thus, it is necessary that the amount of $SiO_2$ should be more than 65 wt% in association with the grain size distribution of the quartz material, that the amount of ($K_2O+Na_2O$) should be less than 4.5 wt% and that the ratio of $K_2O/(K_2O+Na_2O)$ should be smaller than 1/2. On the other hand, more than 83 wt% of $SiO_2$ or less than 2 wt% of $K_2O+Na_2O$ or smaller than 1/10 of $K_2O/(K_2O+Na_2O)$ results in a rise of the vitrifying temperature and hence in practice it becomes impossible to effect a complete sintering for the purpose of producing a porcelain solid core electric insulator having a large diameter.

The reason why the amount of $Al_2O_3$ in the batch (A) is limited to 15 to 28 wt% is as follows. When $SiO_2$ is 65 to 83 wt%, $K_2O+Na_2O$ is 2.0 to 4.5 wt% and the ratio of $K_2O/(K_2O+Na_2O)$ is 1/10 to 1/2, the amount of $Al_2O_3$ should naturally be fallen within the scope of 15 to 28 wt%.

The reason why the grain size distribution of the quartz material is limited to not more than 20 wt% of particles with an effective diameter larger than 10 microns is as follows. This limitation ensures an increase of the $SiO_2$ component dissolving into the glass phase during the firing, thus crystallizing more than 25 wt% of cristobalite.

The reason why the alumina material of the batch (B) is limited to 10 to 35 wt% is as follows. The more the amount of the alumina material present in the mixture, the corundum content in the fired porcelain becomes the higher, so that, the mechanical strength of the insulator becomes the higher. On the other hand, more than 35 wt% of the alumina material involves a higher firing temperature necessary for sintering the procelain body while less than 10 wt% of the alumina material causes the mechanical strength of the insulator to decrease, with the result that the desired object cannot be attained.

The reason why the firing temperature is limited to 1,200° to 1,350°C is as follows. When the porcelain body is fired at a temperature lower than 1,200°C, the degree of vitrifying the porcelain body becomes incomplete, while the porcelain body is fired at a temperature higher than 1,350°C, the porcelain body shows an unfavourable tendency of decreasing the mechanical strength thereof. This unfavourable tendency may be due to the excessive dissolution of corundum into the glassy phase.

The porcelain body according to the present invention consists of 10 to 35 wt% of corundum, 25 to 40 wt% of cristobalite, 15 to 30 wt% of mullite, 2 to 8 wt% of quartz and the remainder of glassy phase.

Calcined alumina or calcined bauxite available in market may be used as the alumina material. The use of the calcined bauxite ensures a decrease of the vitrifying temperature of the porcelain body if compared with the use of the calcined alumina available in market, and provides the advantage that a porcelain solid core electric insulator having a large diameter, etc. can be fired in a comparatively easy manner.

The invention will now be described with reference to several examples. In each of the following examples use was made of materials whose chemical compositions and mineral compositions measured by X-ray diffraction are shown in the following Table 1.

TABLE 1

|  |  | Alumina available in Market | Calcined Bauxite available in Demerara | "Fukushima Quartzite" | "Kumamoto Pottery Stone" | "Nagasaki Feldspar" | "Niigata Feldspar" | "Gifu Gaerome Clay" |
|---|---|---|---|---|---|---|---|---|
| Chemical composition (wt %) | Ignition Loss | 0.18 | 0.30 | 0.20 | 2.96 | 0.67 | 0.39 | 12.64 |
|  | $SiO_2$ | Trace | 4.20 | 99.58 | 78.42 | 80.02 | 66.83 | 50.34 |
|  | $Al_2O_3$ | 99.74 | 91.23 | 0.02 | 14.35 | 12.56 | 17.72 | 33.87 |
|  | $Fe_2O_3$ | 0.02 | 1.07 | 0.04 | 0.75 | 0.08 | 0.10 | 1.32 |
|  | $TiO_2$ | Trace | 2.90 | Trace | 0.15 | 0.04 | Trace | 0.63 |
|  | CaO | 0.05 | 0.14 | — | 0.10 | 0.57 | 0.18 | 0.06 |
|  | MgO | Trace | 0.05 | — | 0.07 | 0.02 | Trace | 0.34 |
|  | $K_2O$ | 0.02 | 0.04 | — | 3.08 | 0.43 | 10.99 | 0.78 |
|  | $Na_2O$ | 0.24 | 0.04 | — | 0.21 | 5.66 | 3.60 | 0.13 |
|  | Total | 100.25 | 99.97 | 99.84 | 100.09 | 100.05 | 99.81 | 100.11 |
| Mineral composition (wt%) | Quartz | — | — | 100.0 | 60.8 | 38.1 | 9.8 | 8.3 |
|  | Kaolinite | — | — | — | 7.6 | — |  | 87.1 |
|  | Sericite | — | — | — | 30.5 | — |  | — |
|  | Feldspar | — | — | — | 0.5 | 46.0 | 89.7 | — |

EXAMPLE 1

Use was made of porcelain having compositions shown in the following Table 2.

Table 2

| | Composition (wt%) | |
|---|---|---|
| | Porcelain according to the invention | Conventional alumina containing porcelain |
| Alumina | 20 | 20 |
| Fukushima Quartzite | 20 | 25 |
| Nagasaki Feldspar | 25 | — |
| Niigata Feldspar | — | 17 |
| Gifu Gaerome Clay | 35 | 38 |
| Total | 100 | 100 |

The Fukushima quartzite was pulverized beforehand such that its grain size distribution consists of 15 wt% of particles with an effective diameter larger than 10 microns. The final mixture prepared was pulverized such that its grain size distribution consists of 18 wt% of particles with an effective diameter larger than 10 microns.

The mixture having the compositions shown in the Table 2 was formed into a rod-shaped solid testing body having a diameter of 120 mm. This testing body was fired at 1,300°C to obtain porcelain having characteristics shown in the following Table 3. The amount of crystals present in the fired testing porcelain was measured with the method of the quantative analysis by X-ray diffraction. The average values of the strength of undamaged and damaged testing porcelains were measured with the same method as described before.

Table 3

| | Porcelain according to the invention | Conventional porcelain |
|---|---|---|
| Amounts of crystals (wt%) | | |
| corundum | 20 | 20 |
| cristobalite | 33 | 0 |
| mullite | 21 | 17 |
| quartz | 4 | 12 |
| Bending strength of undamaged porcelain: $\sigma_1$ | 1,340 kg/cm² | 1,150 kg/cm² |
| Bending strength of externally damaged (2 mm in depth) porcelain: $\sigma_2$ | 700 kg/cm² | 340 kg/cm² |
| $\sigma_2/\sigma_1 \times 100$ (%) | 52.2 | 29.6 |

EXAMPLE 2

25 wt% of calcined bauxite used as alumina material and pulverized such that its grain size distribution consists of 30 wt% of particles with an effective diameter larger than 10 microns, 22 wt% of Kumamoto Pottery Stone and pulverized such that its grain size distribution consists of 18 wt% of particles with an effective diameter larger than 10 microns, 23 wt% of Nagasaki Feldspar and 30 wt% of Gifu Gaerome Clay were mixed together to prepare a mixture. The mixture thus obtained was further pulverized such that its grain size distribution consists of 20 wt% of particles with an effective diameter larger than 10 microns. A solid core station post insulator having such fired dimensions that a drum diameter is 125 mm, a shed diameter 220 mm and a total length 1,150 mm was produced as a test insulator. This test insulator was fired at 1,280°C. The amounts of crystals present in the fired test insulator was 16 wt% corundum, 35 wt% cristobalite, 23 wt% mullite and 3 wt% quartz. The average value of the bending strength $\sigma_1$ of an undamaged solid core station post insulator was 1,280 kg/cm². The average value of the bending strength $\sigma_2$ of the test insulator whose three sheds near that portion which is subjected to the maximum tensile stress have been broken by a hammer was 660 kg/cm², and $\sigma_2/\sigma_1 \times 100$ was 51.5%. On the other hand, the conventional cristobalite porcelain electric insulator not containing alumina material showed $\sigma_1 = 860$ kg/cm², $\sigma_2 = 410$ kg/cm² and $\sigma_2/\sigma_1 \times 100 = 47.6\%$, while the conventional alumina containing porcelain electric insulator whose alumina material content is 25 wt% showed $\sigma_1 = 1,200$ kg/cm², $\sigma_2 = 420$ kg/cm² and $\sigma_2/\sigma_1 = 100 = 35\%$. The above mentioned results are shown in FIG. 2.

As explained hereinbefore the porcelain electric insulator having an excellent mechanical strength and an excellent bending strength even after being externally damaged according to the invention ensures considerable improvement on the standard strength level of high strength porcelain electric insulators for use in the high and extra high voltage power transmission and further provides the important advantage that reliability of the strength characteristics can be improved thus giving contribution towards the high voltage power transmission industry.

Whereas we have shown and described our invention with respect to embodiments thereof which give satisfactory results, it should be understood that the principles of the invention may be applied to other modifications made without departing from the spirit and scope of the invention.

What is claimed is:

1. A porcelain consisting of 10 to 35 percent by weight of corundum, 25 to 40 percent by weight of cristobalite, 15 to 30 percent by weight of mullite, 2 to 8 percent by weight of quartz and the remainder of glassy phase.

2. An electric insulator whose porcelain body consists of 10 to 35 percent by weight of corundum, 25 to 40 percent by weight of cristobalite, 15 to 30 percent by weight of mullite, 2 to 8 percent by weight of quartz and the remainder of glassy phase.

3. A solid core insulator whose porcelain body consists of 10 to 35 percent by weight of corundum, 25 to 40 percent by weight of cristobalite, 15 to 30 percent by weight of mullite, 2 to 8 percent by weight of quartz and the remainder of glassy phase.

4. A porcelain electric insulator whose porcelain body consists of 10 to 35 percent by weight of corundum, 25 to 40 percent by weight of cristobalite, 15 to 30 percent by weight of mullite, 2 to 8 percent by weight of quartz and the remainder of glassy phase, and wherein said porcelain body is fired at a temperature of 1,200°C to 1,350°C from a mixture consisting of 65 to 90 percent by weight of a batch (A) and 10 to 35 percent by weight of a batch (B), wherein said batch (A) consists essentially of feldspathic material, quartz material and clay material, minerally comprising 10 to 20 percent by weight of a feldspar substance, 30 to 60 percent by weight of a quartz substance and 20 to 50 percent by weight of a clay substance and chemically comprising 65 to 83 percent by weight of $SiO_2$, 15 to 28 percent by weight of $Al_2O_3$, 2.0 to 4.5 percent by weight of $K_2O + Na_2O$ and normal impurities, wherein the ratio of $K_2O/(K_2O+Na_2O)$ is from 1/10 to 1/2, and wherein said quartz material has a grain size distribution consisting of not more than 20 percent by weight of particles with an effective diameter larger than 10 microns, and wherein said batch (B) is alumina material.

5. A porcelain electric insulator according to claim 4, wherein said alumina material is calcined alumina.

6. A porcelain electric insulator according to claim 5, wherein said alumina material is calcined bauxite.

7. A method for producing a porcelain electric insulator comprising: preparing a mixture consisting of 65 to 90 wt% of a batch (A) wherein said batch (A) consists essentially of feldspathic material, quartz material and clay material, minerally consists of 10 to 20 wt% of feldspar substance, 30 to 60 wt% of quartz substance and 20 to 50 wt% of clay substance, and chemically consists of 65 to 83 wt% of $SiO_2$, 15 to 28 wt% of $Al_2O_3$, 2.0 to 4.5 wt% of $K_2O + Na_2O$ and normal impurities and having a ratio of $K_2O/(K_2O + Na_2O)$ of 1/10 to 1/2, said quartz material having a grain size distribution consisting of not more than 20 wt% of particles with an effective diameter larger than 10 microns and 10 to 35 wt% of a batch (B) wherein said batch (B) comprises alumina material; dehydrating and shaping the mixture to form an electric insulator body; and drying the body and firing the dried body at a temperature of 1,200° to 1,350°C to form a porcelain electric insulator.

8. A method for producing a porcelain electric insulator according to claim 7; wherein the alumina material comprises calcined bauxite.

9. A method for producing a porcelain electric insulator according to claim 7; wherein the alumina material comprises calcined alumina.

10. A method for producing a porcelain solid core electric insulator comprising; preparing a mixture consisting of 65 to 90 wt% of a batch (A) wherein said batch (A) consists essentially of feldspathic material, quartz material and clay material, minerally consists of 10 to 20 wt% of feldspar substance, 30 to 60 wt% of quartz substance and 20 to 50 wt% of clay substance, and chemically consists of 65 to 83 wt% of $SiO_2$, 15 to 28 wt% of $Al_2O_3$, 2.0 to 4.5 wt% of $K_2O + Na_2O$ and normal impurities and having a ratio of $K_2O/(K_2O + Na_2O)$ of 1/10 to 1/2, said quartz material having a grain size distribution consisting of not more than 20 wt% of particles with an effective diameter larger than 10 microns and 10 to 35 wt% of a batch (B) wherein said batch (B) comprises alumina material; dehydrating and shaping the mixture to form a solid core electric insulator body; and drying the body and firing the dried body at a temperature of 1,200° to 1,350°C to form a porcelain solid core electric insulator.

11. A method for producing a porcelain solid core electric insulator according to claim 10; wherein the alumina material comprises calcined bauxite.

12. A method for producing a porcelain solid core electric insulator according to claim 10; wherein the alumina material comprises calcined alumina.

13. A method for producing a porcelain electric insulator whose porcelain body consists of 10 to 35 percent by weight of corundum, 25 to 40 percent by weight of cristobalite, 15 to 30 percent by weight of mullite, 2 to 8 percent by weight of quartz and the remainder of glassy phase comprising: preparing a mixture consisting of 65 to 90 wt% of a batch (A) wherein said batch (A) consists essentially of feldspathic material, quartz material and clay material, minerally consists of 10 to 20 wt% of feldspar substance, and 30 to 60 wt% of quartz substance and 20 to 50 wt% of clay substance and chemically consists of 65 to 83 wt% of $SiO_2$, 15 to 28 wt% of $Al_2O_3$, 2.0 to 4.5 wt% of $K_2O + Na_2O$ and normal impurities and having a ratio of $K_2O/(K_2O + Na_2O)$ of 1/10 to 1/2, said quartz material having a grain size distribution consisting of not more than 20 wt% of particles with an effective diameter larger than 10 microns and 10 to 35 wt% of a batch (B) wherein said batch (B) comprises alumina material; dehydrating and shaping the mixture to form an electric insulator body; and drying the body and firing the dried body at a temperature of 1,200° to 1,350°C to form a porcelain electric insulator.

14. A method for producing a porcelain electric insulator according to claim 13; wherein the alumina material comprises calcined bauxite.

15. A method for producing a porcelain electric insulator according to claim 13, wherein the alumina material comprises calcined alumina.

16. A method for producing a poreclain solid core electric insulator whose porcelain body consists of 10 to 35 percent by weight of corundum, 25 to 40 percent by weight of cristobalite, 15 to 30 percent by weight of mullite, 2 to 8 pecent by weight of quartz and the remainder of glassy phase comprising: preparing a mixture consisting of 65 to 90 wt% of a batch (A) wherein said batch (A) consists essentially of feldspathic material, quartz material and clay material, minerally consists of 10 to 20 wt% of feldspar substance, 30 to 60 wt% of quartz substance and 20 to 50 wt% of clay substance, and chemically consists of 65 to 83 wt% of $SiO_2$, 15 to 28 wt% of $Al_2O_3$, 2.0 to 4.5 wt% of $K_2O + Na_2O$ and normal impurities and having a ratio of $K_2O/(K_2O + Na_2O)$ of 1/10 to 1/2, said quartz material having a grain size distribution consisting of not more than 20 wt% of particles with an effective diameter larger than 10 microns and 10 to 35 wt% of a batch (B) wherein said batch (B) comprises alumina material; dehydrating and shaping the mixture to form a solid core electric insulator body; and drying the body and firing the dried body at a temperature of 1,200° to 1,350°C to form a porcelain solid core electric insulator.

17. A method for producing a porcelain solid core electric insulator according to claim 16, wherein the alumina material comprises calcined bauxite.

18. A method for producing a porcelain solid core electric insulator according to claim 16, wherein the alumina material comprises calcined alumina.

* * * * *